United States Patent
Pawar et al.

(10) Patent No.: US 8,040,803 B1
(45) Date of Patent: *Oct. 18, 2011

(54) USING PACKET-TRANSPORT METRICS FOR CALL-ADMISSION CONTROL

(75) Inventors: Hemanth Balaji Pawar, Herndon, VA (US); Shilpa Kowdley Srinivas, Herndon, VA (US); Anoop K. Goyal, Overland Park, KS (US); Bhagwan Khanka, Lenexa, KS (US); Duane A. Tomka, Wauwatosa, WI (US)

(73) Assignee: Sprint Spectrum L.P., Overland Park, KS (US)

( * ) Notice: Subject to any disclaimer, the term of this patent is extended or adjusted under 35 U.S.C. 154(b) by 88 days.

This patent is subject to a terminal disclaimer.

(21) Appl. No.: 12/350,694

(22) Filed: Jan. 8, 2009

(51) Int. Cl.
*H04L 12/16* (2006.01)
*H04B 7/216* (2006.01)
*H04J 1/16* (2006.01)
*H04W 72/08* (2009.01)

(52) U.S. Cl. ...... 370/231; 370/329; 370/252; 455/452.2

(58) Field of Classification Search ............... 370/231, 370/332, 252, 229–230, 401, 328, 232, 335, 370/329, 342–343; 455/436, 452.2, 442, 455/452.1

See application file for complete search history.

(56) References Cited

U.S. PATENT DOCUMENTS

| | | | |
|---|---|---|---|
| 6,021,328 A | 2/2000 | Curtis et al. | |
| 6,148,207 A | 11/2000 | Baum et al. | |
| 6,591,110 B1 | 7/2003 | Kim et al. | |
| 6,606,496 B1 | 8/2003 | Salvarani et al. | |
| 6,757,520 B2 * | 6/2004 | Attar et al. | 455/63.1 |
| 6,839,356 B2 | 1/2005 | Barany et al. | |
| 7,058,124 B2 | 6/2006 | Koo | |
| 7,099,283 B2 | 8/2006 | Matta et al. | |
| 7,245,915 B2 | 7/2007 | Matta et al. | |
| 7,474,627 B2 * | 1/2009 | Chheda et al. | 370/252 |
| 2002/0061749 A1 | 5/2002 | Hunzinger | |
| 2003/0095551 A1 | 5/2003 | Gotoh et al. | |
| 2003/0117956 A1 | 6/2003 | Lee | |
| 2003/0129982 A1 | 7/2003 | Perini | |
| 2004/0037291 A1 | 2/2004 | Attar et al. | |
| 2004/0109424 A1 | 6/2004 | Chheda | |
| 2004/0218533 A1 | 11/2004 | Kim et al. | |

(Continued)

FOREIGN PATENT DOCUMENTS

WO WO 2004/004249 A1 1/2004

OTHER PUBLICATIONS

Unpublished U.S. Appl. No. 12/141,569, filed Jun. 18, 2008 entitled "Method for Initiating Handoff of a Wireless Access Terminal Based on the Reverse Activity Bit".

(Continued)

*Primary Examiner* — Kwang B Yao
*Assistant Examiner* — Candal Elpenord

(57) ABSTRACT

Methods and systems are provided for using packet-transport metrics for call-admission control. In an embodiment, a base station provides packet-data service to mobile stations, which comprises (a) providing wireless service over an air interface in a wireless coverage area and (b) providing transport service over a packet-data network. The base station measures, over at least the packet-data network, each packet-transport metric in a set of one or more packet-transport metrics. The base station conducts call-admission control in the wireless coverage area based at least in part on the one or more measured packet-transport metrics.

17 Claims, 3 Drawing Sheets

U.S. PATENT DOCUMENTS

| | | | |
|---|---|---|---|
| 2005/0032522 | A1 | 2/2005 | Soong et al. |
| 2005/0052996 | A1* | 3/2005 | Houck et al. .................. 370/230 |
| 2006/0077994 | A1 | 4/2006 | Spindola et al. |
| 2006/0159045 | A1 | 7/2006 | Ananthaiyer |
| 2006/0250953 | A1* | 11/2006 | Mooney et al. ............... 370/229 |
| 2006/0252429 | A1* | 11/2006 | Chen et al. .................... 455/450 |
| 2006/0291383 | A1* | 12/2006 | Bi et al. ........................ 370/229 |
| 2007/0242702 | A1 | 10/2007 | Shim |
| 2008/0008093 | A1* | 1/2008 | Wang et al. ................... 370/235 |
| 2008/0049706 | A1 | 2/2008 | Khandekar et al. |
| 2008/0080414 | A1* | 4/2008 | Thubert et al. ................ 370/328 |
| 2008/0137614 | A1 | 6/2008 | Kwon |
| 2008/0186846 | A1* | 8/2008 | Stephenson et al. .......... 370/230 |
| 2008/0247450 | A1 | 10/2008 | Alexander et al. |
| 2009/0086629 | A1* | 4/2009 | Zhang et al. .................. 370/230 |
| 2009/0170547 | A1* | 7/2009 | Raghothaman et al. ...... 455/522 |
| 2009/0257361 | A1 | 10/2009 | Deshpande et al. |
| 2009/0285159 | A1 | 11/2009 | Rezaiifar |

OTHER PUBLICATIONS

Unpublished U.S. Appl. No. 11/746,229, filed May 9, 2007 entitled "Using VoIP-Quality Metrics to Dynamically Adjust the EV-DO Reverse Activity Bit".

First Action Interview Pilot Program Pre-Interview Communication from U.S. Appl. No. 11/746,229, mailed Dec. 30, 2009.

Unpublished U.S. Appl. No. 12/397,855, filed Mar. 4, 2009 entitled "Using Packet-Transport Metrics for Setting DRCLocks".

Unpublished U.S. Appl. No. 12/432,736, filed Apr. 29, 2009 entitled "Using DRCLocks for Conducting Call Admission Control".

Unpublished U.S. Appl. No. 12/494,999, filed Jun. 30, 2009 entitled "Implementing Quality of Service (QoS) by Using Hybrid ARQ (HARQ) Response for Triggering the EV-DO Reverse Activity Bit (RAB)".

Unpublished U.S. Appl. No. 12/507,913, filed Jul. 23, 2009 entitled "Achieving Quality of Service (QoS) by Using the Reverse Activity Bit (RAB) in Creation of Neighbor Lists for Selected Access Terminals".

Pre-Interview Communication mailed on Dec. 30, 2009 in U.S. Appl. No. 11/746,229.

First Action Interview Summary mailed on Jun. 2, 2010 in U.S. Appl. No. 11/746,229.

Notice of Allowance mailed on Aug. 3, 2010 in U.S. Appl. No. 11/746,229.

Non-Final Office Action mailed on Oct. 12, 2010 in U.S. Appl. No. 12/397,855.

Final Office Action mailed on Apr. 1, 2011 in U.S. Appl. No. 12/397,855.

Non-Final Office Action mailed on Mar. 22, 2011 in U.S. Appl. No. 12/141,569.

* cited by examiner

| METRIC | METRIC THRESHOLD |
|---|---|
| DELAY | DELAY_THRESHOLD_202 |
| JITTER | JITTER_THRESHOLD_204 |
| PACKET LOSS | PACKET_LOSS_THRESHOLD_206 |

THRESHOLD TABLE 200

FIG. 2

USING PACKET-TRANSPORT METRICS FOR CALL-ADMISSION CONTROL

BACKGROUND

1. Technical Field

The present disclosure relates to wireless communications, and, more particularly, to conducting call-admission control in wireless communication systems.

2. Description of Related Art

Many people use mobile stations, such as cell phones and personal digital assistants, to communicate with cellular wireless networks, which typically provide communication services such as voice, text messaging, and packet-data communication to these mobile stations. The mobile stations and networks typically communicate with each other over a radio frequency (RF) air interface according to a wireless protocol such as 1xRTT CDMA, EV-DO, WiMax, etc.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC) (or radio network controller (RNC)), which controls one or more BTSs, and which acts as a conduit between the BTS(s) and one or more switches or gateways, such as a mobile switching center (MSC) and/or a packet data serving node (PDSN), which may interface with one or more signaling and/or transport networks.

As such, mobile stations can typically communicate with one or more endpoints over the one or more signaling and/or transport networks from anywhere inside the coverage area of one or more BTSs, via the BTS(s), a BSC, and an MSC and/or a PDSN. In typical arrangements, MSCs interface with the public switched telephone network (PSTN), while PDSNs interface with one or more core packet-data networks and/or the Internet.

SUMMARY

Methods and systems are provided for using packet-transport metrics for call-admission control. In one aspect, an embodiment may take the form of a method. In accordance with the method, packet-data service is provided to mobile stations. Providing packet-data service to mobile stations comprises (a) providing wireless service over an air interface in a wireless coverage area and (b) providing transport service over a packet-data network. Each packet-transport metric in a set of one or more packet-transport metrics is measured over at least the packet-data network. Call-admission control is conducted in the wireless coverage area based at least in part on the one or more measured packet-transport metrics.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 2 depicts a data table, in accordance with exemplary embodiments; and

DETAILED DESCRIPTION OF EXEMPLARY EMBODIMENTS

1. Overview

Figure 1:
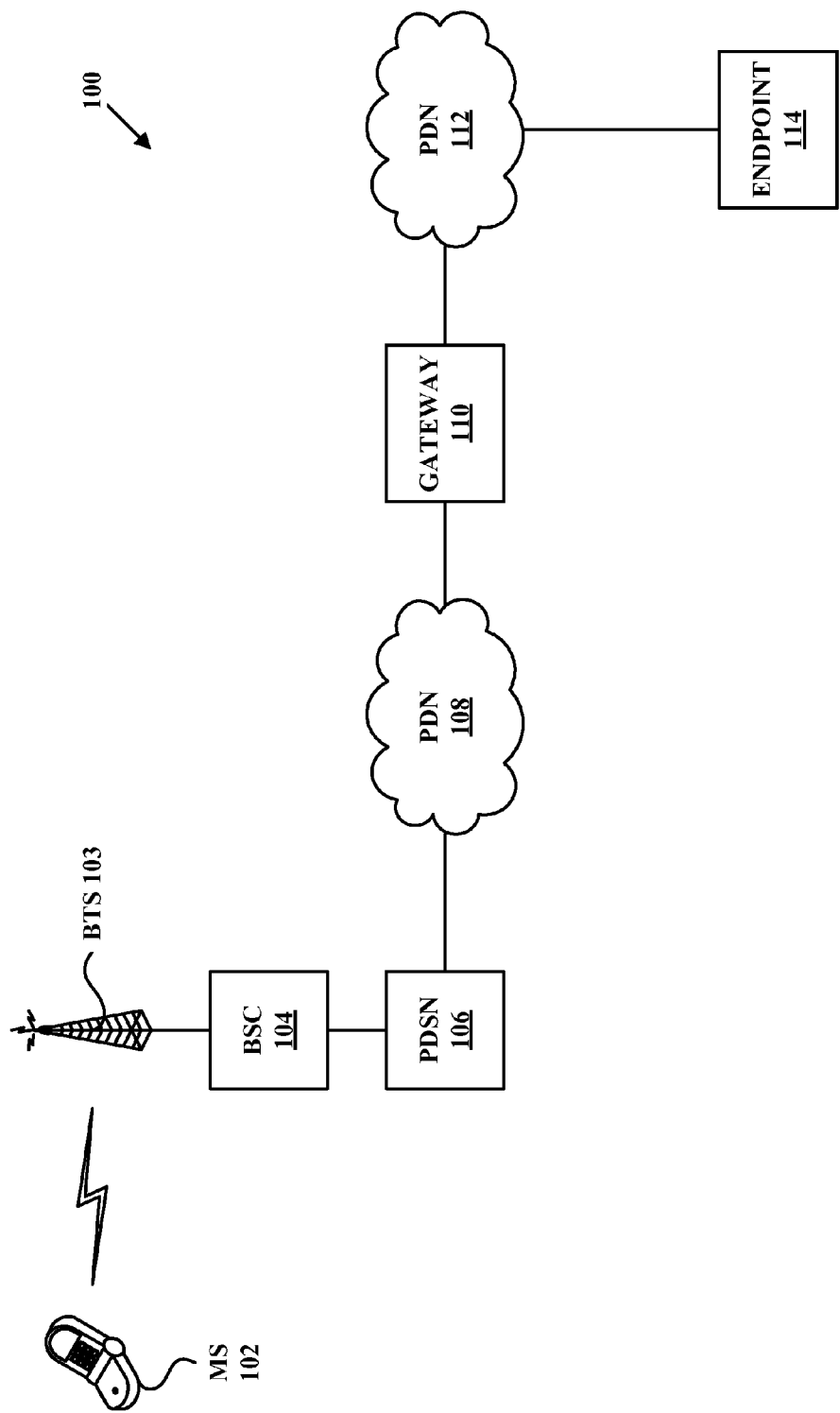
FIG. 1 is a simplified block diagram of a communication system, in accordance with exemplary embodiments.

When a mobile station engages in packet-data communication over one or more packet-data networks via one or more BTSs, one or more BSCs, and one or more PDSNs, that packet-data communication may be with one or more different types of endpoints. Some examples of endpoints include other mobile stations, landline phones, conference servers, gateways, etc. In the case of landline phones, a media gateway may reside between a packet-data network and a telephone network such as the PSTN. For simplicity of explanation, examples involving a mobile station communicating with one endpoint over a packet-data network via one BTS, one BSC, and one PDSN may be described herein; however, the present disclosure could just as well be applied to more complex examples, perhaps involving communication sessions between a mobile station and multiple endpoints, such as may be the case in a conference call.

Furthermore, a given instance of packet-data communication engaged in by a mobile station may be of any type. One popular type is Voice over IP (VoIP), which may have a user experience that is similar to voice calls conducted over the PSTN via a BTS, a BSC, and an MSC. VoIP calls (i.e. sessions) may also or instead take the form of push-to-talk (PTT) sessions, known to those in the art. In general, as used herein, "VoIP" encompasses any type of voice-over-packet communication that may be engaged in by mobile stations. More generally, the methods and systems described herein may be applied to any type of data communication, though doing so with respect to latency-sensitive types such as VoIP, video-conferencing, streaming media, etc. may yield the greatest dividends with respect to user satisfaction.

In connection with latency-sensitive types of packet-data communication, it is generally considered important that packets carrying bearer (e.g. voice) data traverse from source to destination quickly, consistently, and reliably, among other desirable descriptors. Stated in terms typically used in the art, it is important and desirable that bearer packets traverse between one endpoint of the communication (e.g. a mobile station) and the other (e.g. a media gateway residing between a packet-data network, such as the Internet, and the PSTN) with relatively little delay, jitter, or packet loss. These terms are referred to herein as packet-transport metrics; in the context of VoIP, they may be referred to as VoIP-quality metrics. Using VoIP as an example, if a VoIP call has relatively poor values of delay, jitter, and/or packet loss, then the voice quality (experienced by one, both, or all participants) will be degraded, which is undesirable.

Note that these packet-transport metrics could be measured between a mobile station and the other endpoint of the communication session, between a network element (e.g. BTS or BSC) and the other endpoint, or on some other subpart of a communication path of a communication session. In general, the metrics will be described herein as being measured between a network element and the other endpoint in the communication session (i.e. on the backhaul), though this is for illustration and not limitation. This implementation choice may, however, avoid mobile stations having to report these metrics to the base station, which may be the entity that is making the call-admission-control decisions in the first place, making the base station an efficient choice for being one endpoint of the path along which these metrics are measured and evaluated.

With respect to the first of the packet-transport metrics referenced above, delay is generally defined as the time taken for packets to get from one point to another in a network. Note that delay can be measured one-way, round-trip, or both. Typically, measuring round-trip delay is easier and requires less-expensive equipment. Note that, to obtain rough estimate of one-way delay, round-trip delay can be measured and then divided in half. A typical tolerance level for one-way delay in a VoIP context may be approximately 150-250 milliseconds (ms), before the quality of call degrades to a point that is generally considered unacceptable.

Jitter is typically defined as the variation in delay over some period of time between the network points for which the delay is measured. In general, if the delay of VoIP-packet transmissions varies too widely during a particular VoIP call, in other words if the jitter is too high, then the call quality typically would be significantly degraded.

Finally, some VoIP packets transmitted from the source never make it to the destination; i.e. they are lost. Packet loss, then, is typically defined as the ratio of (i) the number of packets that never make it to their destination to (ii) the total number of packets that were transmitted (including those that made it to their destination and those that did not) over some time period. The higher this ratio is, the more the VoIP call quality will be degraded, since certain portions of the audio will not be available for playout, and retransmission is generally not thought to be a practical solution to packet loss in real-time applications such as VoIP.

When a given base station—and a given wireless network in general—provides packet-data service (e.g. VoIP service) to a given mobile station, the base station is providing at least two services to that mobile station. The first is wireless service over the air interface, and the other is transport service (i.e. connectivity) over one or more packet-data networks, such as direct transport service over the service provider's privately-operated core packet-data network, as well as indirect transport service over a public packet-data network such as or including the Internet. In general, the packet-transport metrics referred to herein pertain to the transport service, and reflect the quality of network (or "transport") conditions over the packet-data network(s) that the packets—sent to and from a given mobile station—traverse.

Further with respect to terminology, call-admission control refers to admitting or denying new users (i.e. mobile stations) service in a given wireless coverage area, such as a cell or sector. In particular, call-admission control involves making decisions to grant or deny service to mobile stations upon receiving requests for service (e.g. call-origination messages or requests to handoff to the coverage area) from those mobile stations. Note that these decisions may be described herein as being made by a base station, which encompasses the possibilities of the decisions being made by a BTS, by a BSC, by some other entity, or perhaps by a combination thereof.

Note that, in current implementations, call-admission-control decisions are made based on considerations pertaining only to the communication link between the base station and the one or more mobile stations currently communicating with the base station in, e.g., a given sector. More particularly, current wireless-network implementations conduct call-admission control (i.e. admit or deny new users) based on criteria (referred to herein as "sector conditions") such as air-interface conditions and current available capacity of the base station. Naturally, there will be times when sector conditions are favorable for admitting new users, and there will be times when sector conditions are unfavorable for admitting new users. As described above, current network implementations generally handle these various times by admitting or denying new users based solely on sector conditions.

However, there will also be times when transport conditions will be favorable (e.g. when delay, jitter, and packet loss are all acceptably low), and there will be times when transport conditions are unfavorable (e.g. when at least one of delay, jitter, or packet loss are unacceptably high). When transport conditions are unfavorable, it is not desirable to admit new users into the wireless coverage area, since that would result in even more congestion on the backhaul (i.e. even worse transport conditions) at a time when that transport path is already struggling to acceptably transport packets. In current implementations, however, transport conditions are not relevant to call-admission-control decisions; that is, call-admission control is conducted independently of transport conditions between network infrastructure (e.g. base station) and the other endpoint(s) of the communication—IP (i.e. backhaul) congestion is not taken into account.

In accordance with the present invention, then, one or more packet-transport metrics are taken into account as part of making call-admission-control decisions, i.e. as part of deciding whether to admit or deny mobile stations access to sector resources. The set of one or more packet-transport (e.g. VoIP-quality) metrics that are considered may include delay, jitter, packet loss, and/or any other transport metric now known or later developed. Any or all of delay, jitter, and packet loss may be considered, perhaps along with one or more sector conditions.

A base station (e.g. BTS) may maintain respective thresholds for delay, jitter, and packet loss (i.e. a delay threshold, a jitter threshold, and a packet-loss threshold). These thresholds may then be compared with recently derived current values for the respective transport metrics as at least part of making call-admission-control decisions. In some embodiments, the base station may periodically test current values for these metrics against the thresholds. If, e.g., at least one metric exceeds its threshold, the base station may responsively operate (for a period of time until the next evaluation) in a mode where new users are not accepted. In some embodiments, the base station may compare one or more metrics with their respective thresholds in response to receiving a call-origination message or handoff request (or other service-request message from a mobile station that not currently being served by the base station/sector); again, if, e.g. at least one metric exceeds its threshold, that service request message may be denied.

The base station may consider the metrics in any order, and may consider only one or two of them. That is, the base station could consider (i) delay, (ii) jitter, (iii) delay and packet loss, etc. And it should be noted that evaluation of one or more packet-transport metrics need not be to the exclusion of considering other criteria for denying new users; some embodiments may well involve (i) admitting new users when no metrics exceed their thresholds and (ii) denying new users when at least one metric exceeds its threshold. However, other embodiments may involve the denying new users when at least one metric exceeds its threshold, but may further condition admitting new users on, e.g., sector conditions being acceptable as well.

For one or more metrics, the base station could consider only a most-recently-measured value, an average over some previous time period, an average of a worst 10% (or some other percentage) of measurements over some previous time period, and/or any other relevant data set considered appropriate for a given implementation. Note that, in some embodiments, a dual-mode (e.g. EV-DO and 1xRTT CDMA ("1x")) mobile station that is denied service from a first network (e.g. an EV-DO network) may, according to the herein-described methods and systems, attempt to acquire resources from a second network (e.g. a 1x network).

And it should be noted that the above overview is intended to be illustrative and not limiting. Additional and/or different features may be present in some embodiments. And any description of a mobile station, base station, or other network element operating according to any particular protocol is by way of example and not limitation; any suitable wireless protocol(s) may be used, such as but not limited to 1xRTT CDMA, EV-DO, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a BTS 103, a BSC 104, a PDSN 106, a packet-data network (PDN) 108, a gateway 110, a PDN 112, and an endpoint 114. Note that additional entities not depicted in FIG. 1 could be present as well. As an example, there could be more than one mobile station in communication with BTS 103; also, there could be additional entities in communication with PDN 108 and/or PDN 112. Also, there could be one or more routers, switches, other devices and/or networks making up at least part of one or more of the communication links.

Mobile station 102 may be any device arranged to carry out the mobile-station functions described herein, and may include a user interface, a wireless-communication interface, a processor, and data storage comprising instructions executable by the processor for carrying out those mobile-station functions. The user interface may include buttons, a touchscreen, a microphone, and/or any other elements for receiving inputs from users, as well as a speaker, one or more displays, and/or any other elements for communicating outputs to users.

The wireless-communication interface may comprise an antenna and a chipset for communicating with one or more base stations over an air interface. As an example, the chipset could be one suitable for engaging in EV-DO communications, including IS-856, Rel. 0 and/or IS-856, Rev. A communications. The chipset or wireless-communication interface in general may also be able to communicate with a 1xRTT CDMA network, a Wi-Fi (IEEE 802.11) network, and/or one or more additional types of wireless networks. The processor and data storage may be any suitable components known to those of skill in the art. As examples, mobile station 102 could be or include a cell phone, a PDA, a computer, a laptop computer, a hybrid IS-2000/IS-856 device, and/or a multi-mode Wi-Fi/cellular device.

BTS 103 may be any one or any combination of network elements arranged to carry out the BTS functions described herein. As such, BTS 103 may include a communication interface, a processor, and data storage comprising instructions executable by the processor to carry out those BTS functions. The communication interface may include one or more antennas and chipsets or other components for providing one or more coverage areas such as cells or sectors according to a protocol such as 1xRTT CDMA, EV-DO, WiMax, or any other suitable protocol. The communication interface may also include a wired or wireless packet-data interface (i.e. a backhaul connection) such as an Ethernet interface for communicating with BSC 104.

In general, BTS 103 provides wireless service to mobile stations over an air interface using its wireless-communication interface, and transport service over PDN 108 (or perhaps PDN 108 and PDN 112) to those mobile stations using its backhaul connection. BTS 103 may further be able to (e.g. comprise hardware and/or software programmed with the functionality to) measure, as is known in the art, one or more packet-transport metrics such as delay, jitter, and packet loss with respect to communications between mobile stations such as mobile station 102 and endpoints such as endpoint 114.

BSC 104 may be any one or any combination of network elements arranged to carry out the BSC functions described herein. As such, BSC 104 may include a communication interface, a processor, and data storage comprising instructions executable by the processor to carry out those BSC functions. The communication interface may include a wired or wireless packet-data interface such as an Ethernet interface for communicating directly or over one or more networks with PDSN 106. In general, BSC 104 functions to control one or more BTSs, and to serve as a conduit between the one or more BTSs and PDSN 106, enabling mobile stations to communicate over PDN 108 and perhaps beyond.

Furthermore, BTS 103 (and/or BSC 104, among other possibilities) may store—or have access to—thresholds for a set of one or more packet-transport metrics. FIG. 2 depicts one possible arrangement of threshold data that, e.g., BTS 103 may store in data storage or may have access to from one or more other network entities, such as PDSN 106 and/or any other entities. FIG. 2 depicts a threshold table 200, which includes packet-transport-metric thresholds associated with three packet-transport metrics: delay threshold 202 (associated with delay), jitter threshold 204 (associated with jitter), and packet-loss threshold 206 (associated with packet loss). Note that other packet-transport-metric thresholds could be stored in table 200—and considered in accordance with making call-admission-control decisions—instead of or in addition to delay threshold 202, jitter threshold 204, and packet-loss threshold 206.

Note as well that the thresholds 202-206 may take on any values suitable for a particular implementation. In some embodiments, delay threshold 202 may be approximately 150-250 ms. In some embodiments, jitter threshold 204 may be approximately 10-20 ms. In some embodiments, packet-loss threshold 206 may be approximately 1%, 2%, 5%, or thereabouts. And other values could be used as well.

Returning to FIG. 1, PDSN 106 may be any networking server or other device arranged to carry out the PDSN functions described herein. PDSN 106 may include a communication interface, a processor, and data storage comprising instructions executable by the processor for carrying out those PDSN functions. The communication interface may include a wired packet-data interface such as an Ethernet interface for communicating with BSC 104 and/or over PDN 108. Note that PDSN 106 may, instead or in addition, comprise a wireless-communication interface for communicating with BSC 104 and/or over PDN 108. Note also that PDSN 106 may use the same interface or separate interfaces for communicating with BSC 104 and for communicating over PDN 108. PDSN 106 may generally function to provide BSC 104 with access to PDN 108.

Each of PDN 108 and PDN 112 may include one or more wide area networks, one or more local area networks, one or more public networks such as the Internet, one or more private networks, one or more wired networks, one or more wireless networks, and/or one or more networks of any other type. Devices in communication with PDN 108 and/or PDN 112 may exchange data using a packet-switched protocol such as IP, and may be identified by an address such as an IP address. In this example, PDN 108 is the service provider's privately-operated IP network (where the service provider may be operate BTS 103, BTS 104, PDSN 106, etc.), while PDN 112 is the Internet. However, this is for illustration and not by way of limitation. In some embodiments, PDSN 106 may connect directly to the Internet, in which case PDN 108 and gateway 110 may not be necessary. And other configurations are possible as well.

Gateway 110 may be any networking server or other device arranged to carry out the gateway functions described herein. Thus, gateway 110 may include a communication interface, a processor, and data storage comprising instructions executable by the processor for carrying out those gateway functions. The communication interface may include a wired packet-data interface such as an Ethernet interface for communicating over PDN 108 and/or PDN 112. Note that gateway 110 may, instead or in addition, comprise a wireless-communication interface for communicating over PDN 108 and/or PDN 112. Gateway 110 may use the same interface or separate interfaces for communicating over PDN 108 and/or PDN 112. Gateway 110 may generally function to provide PDN 108 and PDN 112 with connectivity to each other.

Endpoint 114 may be any device arranged to carry out the endpoint functions described herein. As such, endpoint 114 may include a (wired and/or wireless) communication interface, a processor, and data storage comprising instructions executable by the processor for carrying out those endpoint functions. Endpoint 114 may be or include a media gateway (perhaps connected to the PSTN), a packet-based telephone, a personal computer, a PDA, a mobile station, an EV-DO access terminal, a PTT server, a call server, and/or any other type of device capable of functioning as an endpoint of a VoIP session—or other type of packet-data-communication session—in accordance with exemplary embodiments.

3. Exemplary Operation

Figure 3:
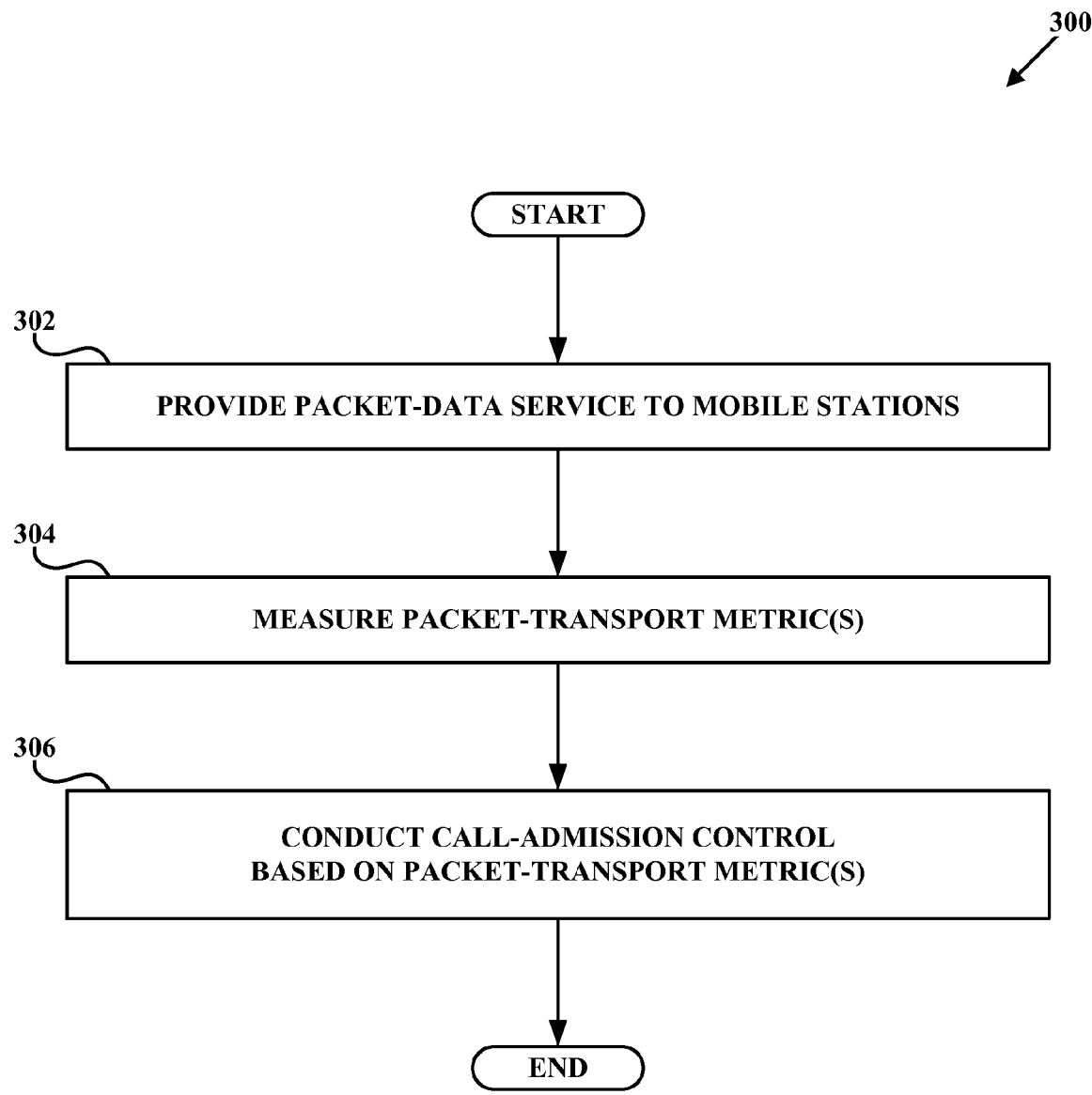
FIG. 3 is a flowchart of a method, in accordance with exemplary embodiments.

FIG. 3 depicts a flowchart of an exemplary method, in accordance with an exemplary embodiment. In some embodiments, as described below in connection with FIG. 3, method 300 may be carried out by a BTS, such as BTS 103. In other embodiments, the method may be carried out by another network entity mentioned herein, such as BSC 104, PDSN 106, some other network entity, or some combination thereof. Note again that the term "base station" may refer to a BTS such as BTS 103, a BSC such as BSC 104, or some combination thereof. In general, the method may be carried out by a base station, an access node, a BTS, a BSC, an RNC, an MSC, a PDSN, some other network entity, or perhaps some combination thereof.

As shown in FIG. 3, method 300 begins at step 302, with BTS 103 providing packet-data service to mobile stations. Step 302 may involve (a) providing wireless service over an air interface in a wireless coverage area (such as a cell or sector) and (b) providing transport service over a packet-data network. The wireless service may be according to at least one of 1xRTT CDMA, EV-DO, WiMax, and WiFi, among many possible examples. At least one of the mobile stations may be or include a cellular telephone, a personal digital assistant, a computer, a laptop computer, a laptop air card, and a hybrid access terminal. Furthermore, the packet-data network may include at least one of a privately-operated core packet-data network, such as PDN 108, and the Internet (which PDN 112 in FIG. 1 represents in some embodiments).

At step 304, BTS 103 measures, over at least the packet-data network, each packet-transport metric in a set of one or more packet-transport metrics, at least one of which may be a VoIP-quality metric. The set of one or more packet-transport metrics may include at least one of delay, jitter, and packet loss. Step 304 may involve measuring each packet-transport metric in the set of one or more packet-transport metrics between mobile stations (that BTS 103 is serving) and endpoints with which the mobile stations are communicating. At least one of the endpoints could be a mobile station, a landline phone, a conference server, or a gateway.

In other embodiments, step 304 may involve measuring each packet-transport metric in the set of one or more packet-transport metrics between at least one network element and endpoints with which the mobile stations (that BTS 103 is serving) are communicating. That network element could be BTS 103, but could instead be any other element, such as but not limited to a base station, an access node, another BTS, a BSC, an RNC, an MSC, and a PDSN. As above, at least one of the endpoints could be a mobile station, a landline phone, a conference server, or a gateway.

Note that, in general, step 304 may involve measuring each packet-transport metric in the set of one or more packet-transport metrics for at least one type of packet-data communication selected from the group consisting of VoIP, PTT, videoconferencing, and streaming media. That is, call-admission control could be conducted such that it takes into account the packet-transport metrics being experienced by VoIP users (which may include PTT users) in particular, or perhaps some different or larger class of latency-sensitive types of packet-data communication. It is also possible to use the metrics being experienced sector wide in connection with all types of packet-data communication. And other possibilities exist as well.

At step 306, BTS 103 conducts call-admission control in the wireless coverage area based at least in part on the one or more measured packet-transport metrics. Note that conducting call-admission control in the wireless coverage area may involve selectively admitting or denying service to new mobile stations in the wireless coverage area.

Furthermore, BTS 103 may maintain a set of one or more packet-transport-metric thresholds, wherein each packet-transport-metric threshold corresponds to a respective packet-transport metric in the set of one or more packet-transport metrics. In some embodiments, BTS 103 may periodically (i.e. once every certain period of time) take a measurement of each packet-transport metric in the set of one or more packet-transport metrics. Also during each period of time, BTS 103 may determine whether a most-recent measurement of each packet-transport metric is less than that metric's corresponding threshold. If so, BTS 103 may admit new mobile stations to the wireless coverage area (for the rest of that period of time). If not, BTS 103 may deny (i.e. not admit) new mobile stations to the wireless coverage area (again, for the rest of that period of time).

In other embodiments, a request for service may trigger evaluation of one or more measured metrics against their respective thresholds. Thus, BTS 103 may receive a service request from a mobile station that is not currently receiving service in the wireless coverage area, and responsively determine whether a most-recent measurement of each packet-transport metric is less than that metric's corresponding threshold. If so, BTS 103 may grant the service request. If not, BTS 103 may deny the service request.

Note that, in some embodiments, as mentioned above, wireless-coverage-area conditions (i.e. sector conditions) such as air-interface conditions (e.g. reverse noise rise, signal-to-noise rations, etc.) and/or current available capacity of the wireless coverage area may also be taken into account in conducting call-admission control. Thus, in some embodiments, unfavorable transport conditions may be sufficient to deny new users; however, favorable transport conditions may not be sufficient to admit new users: favorable wireless-coverage-area conditions may also be required for admission of new users. And other possibilities exist as well.

4. Conclusion

Various exemplary embodiments have been described above. Those skilled in the art will understand, however, that changes and modifications may be made to those examples without departing from the scope of the claims.

The invention claimed is:

1. A method comprising:
   providing packet-data service to mobile stations, wherein providing the packet-data service to the mobile stations comprises (a) providing wireless service over an air interface from a base station to one or more mobile stations in a wireless coverage area and (b) providing a packet data transport service from the base station to a packet-data network;
   maintaining in data storage one or more packet-transport-metric thresholds;
   measuring each packet-transport metric in a set of one or more packet-transport metrics associated with the packet data transport service from the base station to the packet-data network; and
   conducting call-admission control in the wireless coverage area based at least in part on the one or more measured packet-transport metrics of the packet data transport service, wherein conducting the call-admission control comprises receiving a service request from a mobile station that is not currently receiving service in the wireless coverage area, and responsively:
      determining whether a most-recent measurement of each packet-transport metric in the set is less than that metric's corresponding threshold,
      granting the service request in response to determining that the most recent measurement of each packet-transport metric in the set is less than that metric's corresponding threshold; and
      denying the service request in response to determining that the most-recent measurement of at least one packet-transport metric in the set is not less than that metric's corresponding threshold.

2. The method of claim 1, carried out by at least one of a base station, an access node, a base transceiver station (BTS), a base station controller (BSC), a radio network controller (RNC), a mobile switching center (MSC), and a packet data serving node (PDSN).

3. The method of claim 1, wherein providing wireless service comprises providing wireless service according to at least one of 1xRTT CDMA, EV-DO, WiMax, and WiFi.

4. The method of claim 1, wherein the wireless coverage area is a cell or a sector.

5. The method of claim 1, wherein at least one of the mobile stations comprises a cellular telephone, a personal digital assistant, a computer, a laptop computer, a laptop air card, and a hybrid access terminal.

6. The method of claim 1, wherein the packet-data network comprises at least one of a privately-operated core packet-data network and the Internet.

7. The method of claim 1, wherein at least one packet-transport metric is a voice over IP (VoIP)-quality metric.

8. The method of claim 1, wherein measuring each packet-transport metric in the set of one or more packet-transport metrics comprises measuring a packet-transport metric between at least one network element and endpoints with which the mobile stations are communicating.

9. The method of claim 8, wherein the at least one network element is one or more of a base station, an access node, a base transceiver station (BTS), a base station controller (BSC), a radio network controller (RNC), a mobile switching center (MSC), and a packet data serving node (PDSN).

10. The method of claim 8, wherein at least one of the endpoints is a mobile station, a landline phone, a conference server, or a gateway.

11. The method of claim 1, wherein measuring each packet-transport metric in the set of one or more packet-transport metrics comprises measuring a packet-transport metric for at least one type of packet-data communication selected from the group consisting of voice over IP (VoIP), push to talk (PTT), videoconferencing, and streaming media.

12. The method of claim 1, wherein the set of one or more packet-transport metrics comprises at least one of delay, jitter, and packet loss.

13. The method of claim 1, wherein measuring each packet-transport metric in the set of one or more packet-transport metrics comprises taking a measurement of a packet-transport metric in the set of one or more packet-transport metrics once every period of time, and wherein conducting the call-admission control in the wireless coverage area based at least in part on the one or more measured packet-transport metrics comprises carrying out the following steps once every period of time:
   determining whether a most-recent measurement of each packet-transport metric in the set is less than that metric's corresponding threshold,
   admitting new mobile stations to the wireless coverage area in response to determining that the most-recent measurement of each packet-transport metric in the set is less than that metric's corresponding threshold, and
   denying new mobile stations to the wireless coverage area in response to determining that the most-recent measurement of at least one packet-transport metric in the set is not less than that metric's corresponding threshold.

14. The method of claim 1, wherein conducting the call-admission control in the wireless coverage area comprises selectively admitting or denying service to new mobile stations in the wireless coverage area.

15. The method of claim 1, wherein conducting the call-admission control in the wireless coverage area based at least in part on the one or more measured packet-transport metrics comprises conducting call-admission control in the wireless coverage area based at least in part on the one or more measured packet-transport metrics and at least in part on one or more wireless-coverage-area conditions.

16. The method of claim 15, wherein the one or more wireless-coverage-area conditions comprise at least one of an air-interface condition and a current available capacity of the wireless coverage area.

17. A base station comprising:
a wireless-communication interface;
a backhaul connection configured to connect the base station to a packet-data network;
a processor; and
non-transitory data storage comprising instructions executable by the processor for carrying out functions including:
  providing packet-data service to mobile stations, wherein providing the packet-data service to the mobile stations comprises (a) using the wireless-communication interface to provide wireless service over an air interface in a wireless coverage area and (b) using the backhaul connection to provide transport service from the base station to the packet-data network;
  maintaining in data storage one or more packet-transport-metric thresholds, wherein each packet-transport-metric threshold corresponds to a respective packet-transport metric in a set of one or more packet-transport metrics;
  measuring each packet-transport metric in the set of one or more packet-transport metrics associated with the backhaul connection; and
  conducting call-admission control in the wireless coverage area based at least in part on the one or more measured packet-transport metrics associated with the backhaul connection, wherein conducting the call-admission control in the wireless coverage area based at least in part on the one or more measured packet-transport metrics comprises receiving a service request from a mobile station that is not currently receiving service in the wireless coverage area, and responsively:
    determining whether a most-recent measurement of each packet-transport metric in the set is less than that metric's corresponding threshold,
    granting the service request in response to determining that the most recent measurement of each packet-transport metric in the set is less than that metric's corresponding threshold; and
    denying the service request in response to determining that the most-recent measurement of at least one packet-transport metric in the set is not less than that metric's corresponding threshold.

* * * * *